(12) United States Patent
Urienza (10) Patent No.: US 9,621,383 B1
(45) Date of Patent: Apr. 11, 2017

(54) DIGITAL ISOLATOR AND THE METHOD THEREOF

(71) Applicant: Monolithic Power Systems, Inc., San Jose, CA (US)

(72) Inventor: Joseph Urienza, Milpitas, CA (US)

(73) Assignee: MONOLITHIC POWER SYSTEMS, INC., San Jose, CA (US)

(*) Notice: Subject to any disclaimer, the term of this patent is extended or adjusted under 35 U.S.C. 154(b) by 0 days.

(21) Appl. No.: 14/935,177

(22) Filed: Nov. 6, 2015

(51) Int. Cl.
*H04L 25/08* (2006.01)

(52) U.S. Cl.
CPC .................. *H04L 25/085* (2013.01)

(58) Field of Classification Search
CPC ........ H04L 5/22; H04L 25/085; H04B 15/005
See application file for complete search history.

(56) References Cited

U.S. PATENT DOCUMENTS

| | | | | |
|---|---|---|---|---|
| 2014/0211862 A1* | 7/2014 | Moghe | ............... | G06F 13/4072 375/256 |
| 2015/0381219 A1* | 12/2015 | Kramer | ............... | H04B 1/0475 375/297 |
| 2016/0087780 A1* | 3/2016 | Goswami | ............. | H04B 5/0031 370/498 |

* cited by examiner

*Primary Examiner* — Freshteh N Aghdam (57) ABSTRACT

An isolator system has a transmitter configured to generate a first pair of buffered differential signals base based on an input signal; an isolation barrier having an input side coupled to the transmitter to receive the first pair of buffered differential signals, and an output side configured to provide a second pair of differential signals; and a receiver coupled to the output side of isolation barrier to receive the second pair of differential signals, wherein the receiver provides an output signal based on restoring the second pair of differential signals into a third pair of differential signals, wherein the output signal is converted from the third pair of differential signals and is a duplicate of the input signal with inherited propagation delays.

21 Claims, 5 Drawing Sheets

DIGITAL ISOLATOR AND THE METHOD THEREOF

TECHNICAL FIELD

The present technology generally relates to electronic circuits, and more particularly relates to digital isolators and the methods thereof.

BACKGROUND

In some applications, signals should be transmitted between two devices while maintaining electrical isolation between the devices. A signal isolator is a device or circuit for transmitting or receiving electrical signals across an isolation barrier. A signal isolator may use optical, capacitor, radio or transformer to transmit an input signal from one side of the isolation barrier to the other. Each side of the isolation barrier may operate at different voltage, has different supply voltage and has separate isolated ground.

The isolators may be used in noisy industry environment. Thus, the digital isolator between devices should have high Common Mode Transient Immunity (CMTI) to provide reliable communication. Meanwhile, low power consumption is another demand for the digital isolators.

Accordingly, improved devices are desired to address the above features.

SUMMARY

It is an object of the present invention to provide a digital isolator scheme that features high CMTI performance and low power consumption.

In accomplishing the above objective, there has been provided, in accordance with an embodiment of the present invention, an isolator system comprising: a digital isolator system, comprising: a transmitter configured to generate a first pair of buffered differential signals based on an input signal; an isolation barrier having an input side coupled to the transmitter to receive the first pair of buffered differential signals, and an output side configured to provide a second pair of differential signals; and a receiver coupled to the output side of the isolation barrier to receive the second pair of differential signals, wherein the receiver is configured to provide an output signal based on restoring the second pair of differential signals into a third pair of differential signals with valid logic levels, wherein the output signal is converted from the third pair of differential signals and is essentially a duplicate of the input signal but with inherited propagation delays.

In accomplishing the above objective, there has been provided, in accordance with an embodiment of the present invention, a receiver used with a digital isolator system for transmitting an input signal to an output signal, comprising: a differential comparator configured to convert a pair of differential signals with small signal levels to a pair of differential signals with valid logic levels, wherein the pair of differential signals with small signal levels is received from an isolation barrier of the digital isolator system; and a validation circuit configured to validate the pair of differential signals with valid logic levels to a reset signal with pulses which further contribute to the output signal, wherein the output signal is a duplicate of the input signal but with inherited propagation delays.

Furthermore, there has been provided, in accordance with an embodiment of the present invention, a control method for controlling a digital isolator system, comprising: determining if an input signal is in a first logic state, if yes, generating a first pair of buffered differential signals based on the input signal, otherwise, disabling a transmitter side and setting the first pair of buffered differential signals in a default idle state; transmitting the first pair of buffered differential signals to a second pair of differential signals via an isolation barrier; restoring the second pair of differential signals to a third pair of differential signals with valid logic level, wherein the pattern of consecutive and alternating occurrences of the third pair of differential signals are detected for issuing a reset signal; determining if the output signal is in a second logic state, if yes, starting a timeout period to finally set the output signal in a first logic state, otherwise, starting a timeout period to finally set the output signal in the second logic state; detecting if active timing is finished, if yes, setting a receiver side into a sleep mode, otherwise, restoring the signals to a third pair of differential signals with valid logic level, wherein the pattern of consecutive and alternating occurrences of the third pair of differential signals are detected for issuing a reset signal; and determining if the output signal is in a first logic state after the timeout period, if yes, starting a timeout period to finally set the output signal in a second logic state, otherwise, setting a receiver side into the sleep mode.

BRIEF DESCRIPTION OF THE DRAWINGS

Non-limiting and non-exhaustive embodiments are described with reference to the following drawings. The drawings are only for illustration purpose. Usually, the drawings only show part of the devices of the embodiments. These drawings are not necessarily drawn to scale. The relative sizes of elements illustrated by the drawings may differ from the relative size depicted.

The use of the same reference label in different drawings indicates the same or like components.

DETAILED DESCRIPTION

The following description provides a description for exemplary embodiments of the technology. One skilled in the art will understand that the technology may be practiced without some or all of the features described herein. In some instances, well known structures and functions have not been shown or described in detail to avoid unnecessarily obscuring the description of the embodiments of the technology. In some instances, similar structures and functions that have been described in detail for other embodiments are not anymore described in detail for such embodiments to simplify and make clear understanding of the embodiments. It is intended that the terminology used in the description presented below be interpreted in its broadest reasonable manner, even though it is being used in conjunction with a detailed description of certain embodiments of the technology.

Figure 1:
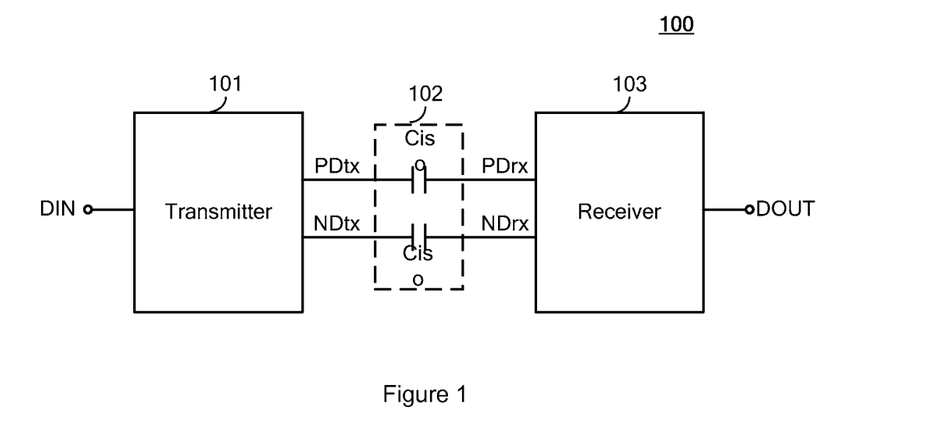
FIG. 1 schematically shows a digital isolator 100 in accordance with an embodiment of the present invention.

FIG. 1 schematically shows a digital isolator system 100 in accordance with an embodiment of the present invention. The isolator system 100 comprises: a transmitter 101 configured to generate a first pair of buffered differential signals PDtx and NDtx based on an input signal DIN; an isolation barrier 102 having an input side coupled to the transmitter 101 to receive the first pair of differential signals PDtx and NDtx, and an output side configured to provide a second pair of differential signals PDrx and NDrx; and a receiver 103 coupled to the output side of isolation barrier 102 to receive the second pair of differential signals PDrx and NDrx, wherein the receiver 103 is configured to provide an output signal DOUT based on restoring the second pair of differential signals PDrx and NDrx into a third pair of differential signals POUT and NOUT with valid logic levels, wherein the output signal DOUT is converted from the third pair of differential signals POUT and NOUT and is essentially a duplicate of the input signal DIN but with inherited propagation delays.

The transmitter 101 and the receiver 103 are galvanically isolated. In one embodiment, the isolation barrier 102 comprises a pair of capacitors Ciso, and each capacitor Ciso has a terminal configured to receive one of the first pair of differential signals PDtx and NDtx, and has another terminal configured to provide correspondingly one of the second pair of differential signals PDrx and NDrx.

In the example of FIG. 1, robust and reliable communications may be performed by transmitting differential mode signals, thus the isolator system 100 inherently has the trait of high common mode rejection. In other words, the system passes differential mode signals but rejects common mode signals.

Figure 2:
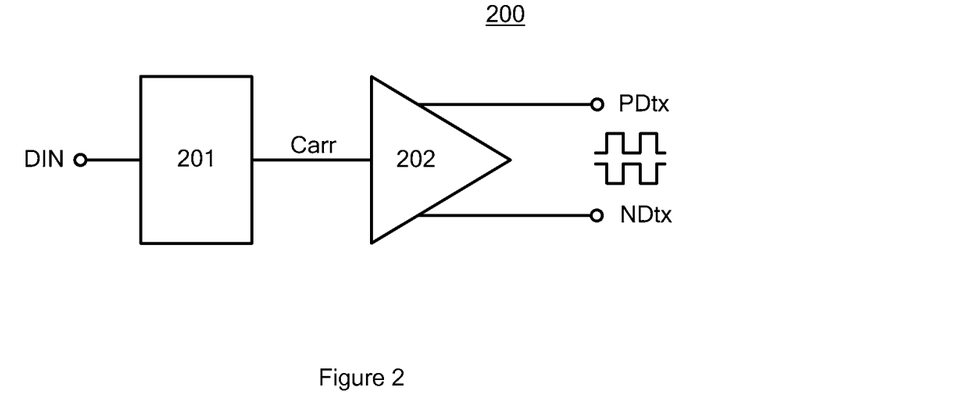
FIG. 2 schematically shows a transmitter 200 in accordance with an embodiment of the present invention.

FIG. 2 schematically shows a transmitter 200 in accordance with an embodiment of the present invention. As shown in FIG. 2, the transmitter 200 comprises: a carrier signal generator 201 having an input terminal configured to receive the input signal DIN, and an output terminal configured to provide an input indication signal Carr based on the input signal DIN; and a differential driver 202 having an input terminal coupled to the output terminal of the carrier signal generator 201 to receive the input indication signal Carr, and a pair of output terminals configured to provide the first pair of buffered differential signals PDtx and NDtx, wherein the first pair of buffered differential signals PDtx and NDtx are complementary.

In the example of FIG. 2, the input signal DIN serves as an enable signal of the carrier signal generator 201. For example, when the input signal DIN is a logic high, the carrier signal generator 201 runs and produces high frequency Carr signal with consecutive pulses (effective), but when the input signal DIN is a logic low, the carrier signal generator 201 is disabled and the input indication signal Carr is in a default logic low state (ineffective). In one embodiment, the first pair of buffered differential signals PDtx and NDtx are complementary logic signals and are continuously running when the input indication signal Carr is effective. Signals PDtx and NDtx are buffered exhibiting fast slew rate and enhancing transmission effectiveness across the isolation barrier.

The transmitter 200 is disabled when the input signal DIN is logic low, thus consumes negligible or no amount of power. In one embodiment, signals PDtx and NDtx, upon enable, start to run with predetermined state, e.g., either signal PDtx or signal NDtx goes low to high first. Starting up with predetermined states yields consistent system behavior and/or sometimes circuits at the receiving side may be minimized or simplified since only one side may need monitoring.

Figure 3:
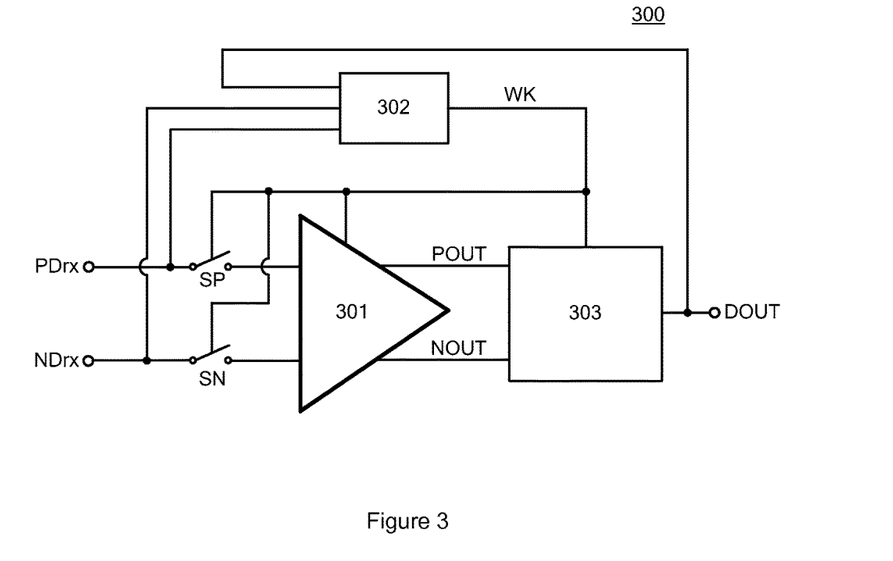
FIG. 3 schematically shows a receiver 300 in accordance with an embodiment of the present invention.

FIG. 3 schematically shows a receiver 300 in accordance with an embodiment of the present invention. As shown in FIG. 3, the receiver 300 comprises: a first switch SP having a first terminal configured to receive one of the second pair of differential signals PDrx, a control terminal configured to receive a wakeup signal WK, and a second terminal configured to switch the signal PDrx at the first terminal to the second terminal when the wakeup signal WK is valid; a second switch SN having a first terminal configured to receive the other one of the second pair of differential signals NDrx, a control terminal configured to receive the wakeup signal WK, and a second terminal configured to switch the signal NDrx at the first terminal to the second terminal when the wakeup signal WK is valid; a differential comparator 301 having a wakeup terminal configured to receive the wakeup signal WK, a first input terminal coupled to the second terminal of the first switch SP, a second input terminal coupled to the second terminal of the second switch SN, and a pair of output terminals configured to provide the third pair of differential signals POUT and NOUT based on the wakeup signal WK, and signals at the first input terminal and the second input terminal; a wakeup circuit 302 having a first input terminal configured to receive the output signal DOUT of the isolator system, a second input terminal and a third input terminal configured to receive the second pair of differential signals PDrx and NDrx, respectively, and an output terminal configured to provide the wakeup signal WK based on the output signal DOUT of the isolator system, and the second pair of differential signals PDrx and NDrx; and a validation circuit 303 having a wakeup terminal configured to receive the wakeup signal WK, a first input terminal and a second input terminal configured to receive the third pair of differential signals POUT and NOUT, and an output terminal configured to provide the output signal DOUT of the isolator system based on the second pair of differential signals POUT and NOUT, and the wakeup signal WK.

In one embodiment, the wakeup circuit 302 may comprise a comparator configured to detect the incoming differential signals PDrx and NDrx. A detection of differential signals causes wakeup circuit 302 to assert the wakeup signal WK. The wakeup signal WK has two purposes: (1) waking up some of the sleeping circuits, e.g., the validation circuit 303; (2) boosting current biases to some weakly biased circuits, e.g., the differential comparator 301. Many circuits are forced to sleep or are weakly biased during idle period (when the input signal DIN is at logic low state). Sometimes (for example, during idle period), critical circuits, e.g., the differential comparator 301, are weakly biased instead of being completely disabled. With this scheme, the digital isolator exhibits minimum power consumption and short propagation delays. In one embodiment, both of the differential comparator 301 and the validation circuit 303 are weakly biased during idle period for quick response and power saving. Persons of ordinary skill in the art should know that, the differential comparator 301, the validation circuit 303, or other circuits may be disabled or weakly biased according to the demands of the system for different applications.

In one embodiment, when the wakeup signal WK is invalid, the switches SP and SN are turned OFF. Meanwhile, the differential comparator 301 is weakly biased and the validation circuit 303 is disabled to reduce power consumption. When the wakeup signal WK becomes valid, the switches SP and SN are turned ON, and the second pair of differential signals PDrx and NDrx are transmitted to the differential comparator 301 via the switches SP and SN. During this time, the differential comparator 301 becomes fully biased and the validation circuit 303 gets enabled. The differential comparator 301 re-establishes the second pair of small signal level differential signals PDrx and NDrx into a third pair of differential signals POUT and NOUT with valid logic level. The validation circuit 303 further processes (or validates) several consecutive differential signals POUT and NOUT, then decides later whether to assert the output signal DOUT logic high or to keep the output signal DOUT logic low.

In one embodiment, the switches SP and SN are highly resistive while in the OFF state. For example, an equivalent resistance of the switch SP or SN is in a range of 10 KOhm~1 MOhm when in the OFF state. In one embodiment, resistors in a range of 10 KOhm~1 MOhm are respectively configured across the switches SP and SN. The high resistance of the switches SP and SN while in the OFF state prevents a floating side (a side configured to the receiver) of the capacitor Ciso from drifting away from the sweet spot of the receiver's input range.

Figure 4:
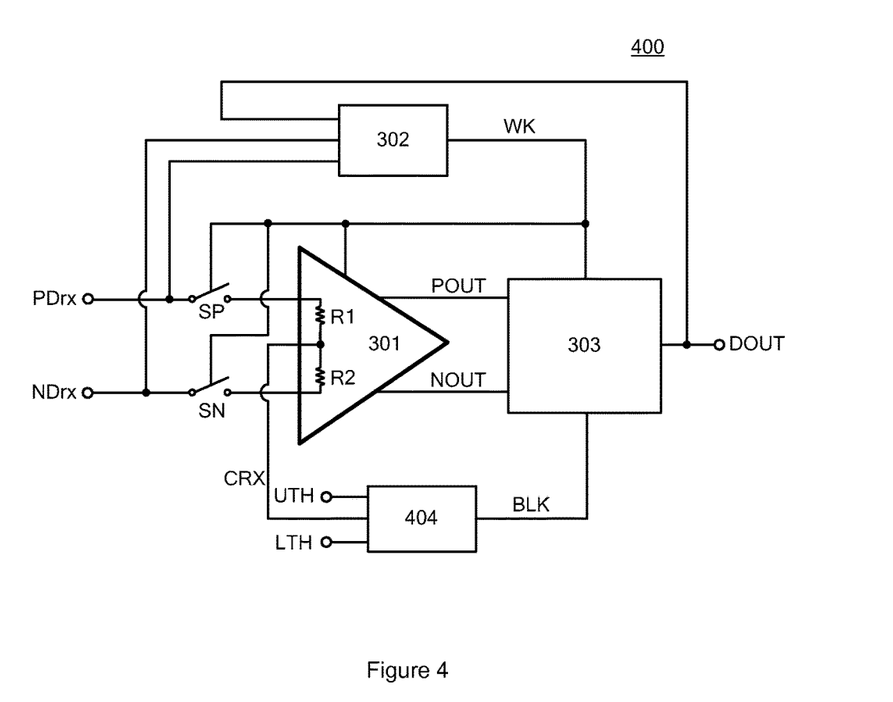
FIG. 4 schematically shows a receiver 400 in accordance with an embodiment of the present invention.

FIG. 4 schematically shows a receiver 400 in accordance with an embodiment of the present invention. As shown in FIG. 4, the receiver 400 comprises: a first switch SP having a first terminal configured to receive one of the second-pair of differential signals PDrx, a control terminal configured to receive a wakeup signal WK, and a second terminal configured to switch the signal PDrx at the first terminal to the second terminal when the wakeup signal WK is valid; a second switch SN having a first terminal configured to receive the other one of the second pair of differential signals NDrx, a control terminal configured to receive the wakeup signal WK, and a second terminal configured to switch the signal NDrx at the first terminal to the second terminal when the wakeup signal WK is valid; a differential comparator 301 having an enable terminal configured to receive the wakeup signal WK, a first input terminal coupled to the second terminal of the first switch SP, a second input terminal coupled to the second terminal of the second switch SN, and a pair of output terminals configured to provide the third pair of differential signals POUT and NOUT based on the wakeup signal WK, and signals at the first input terminal and the second input terminal; a wakeup circuit 302 having a first input terminal configured to receive the output signal DOUT of the isolator system, a second input terminal and a third input terminal configured to receive the second pair of differential signals PDrx and NDrx, respectively, and an output terminal configured to provide the wakeup signal WK based on the output signal DOUT of the isolator system, and the second pair of differential signals PDrx and NDrx; a block circuit 404 having a first input terminal configured to receive an average signal CRX of the second pair of differential signals PDrx and NDrx, a second input terminal configured to receive an upper threshold signal UTH, a third input terminal configured to receive a lower threshold signal LTH, and an output terminal configured to provide a block signal BLK based on the upper threshold signal UTH, the lower threshold signal LTH and the average signal CRX of the second pair of differential signals PDrx and NDrx; and a validation circuit 303 having an enable terminal configured to receive the wakeup signal WK, a first input terminal and a second input terminal configured to receive the third pair of differential signals POUT and NOUT, a fourth input terminal configured to receive the block signal BLK, and an output terminal configured to provide the output signal DOUT of the isolator system based on the third pair of differential signals POUT and NOUT, the wakeup signal WK and the block signal BLK.

The differential comparator 301 has a high CMRR (Common Mode Rejection ratio). During a slow CMTI (Common-Mode Transient Immunity) event, the differential comparator 301 works properly and its high CMRR ensures only differential signals pass through. During a fast CMTI event, the common mode part of the second pair of differential signals PDrx and NDrx causes the magnitude of the second pair of differential signals PDrx and NDrx to be out of the input range of the differential comparator 301, which may lead to an uncertain event. The block circuit 404 is configured to avoid uncertain events of the system during a fast CMTI event. The block circuit 404 detects the average signal CRX of the second pair of differential signals PDrx and NDrx. Once the value of the average signal CRX is out of the hysteresis window limited by the upper threshold signal UTH and the lower threshold signal LTH, the block circuit 404 generates the block signal BLK to momentarily stall the validation circuit 303 until the average signal CRX goes back within the range between the upper threshold signal UTH and the lower threshold signal LTH.

In one embodiment, the block circuit 404 comprises of hysteresis comparators.

The average signal CRX may be generated by performing an averaging operation of the second pair of differential signals PDrx and NDrx. In the example of FIG. 4, the average signal CRX is generated at the node of two resistors R1 and R2 coupled in series between the input terminals of the differential comparator 301. Persons of ordinary skill in the art should know that any circuits that obtain the average signal of the second pair of differential signals PDrx and NDrx may be used without detracting from the merits of the invention.

The wakeup circuit 302 in the examples of FIGS. 3 and 4 may be omitted in some embodiments. In those embodiments, the switches SP and SN, and the wakeup terminals of the differential comparator 301 may be removed. As a result, the first differential signals PDrx and NDrx are provided to the differential comparator 301 directly, and the differential comparator 301 and the validation circuit 303 works all the time.

Figure 5:
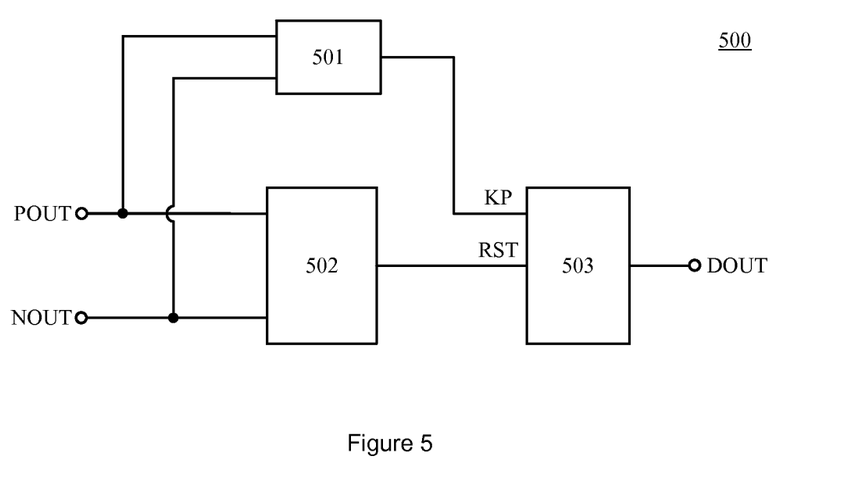
FIG. 5 schematically shows a signal validation circuit 500 in accordance with an embodiment of the present invention.

FIG. 5 schematically shows a validation circuit 500 in accordance with an embodiment of the present invention. In FIG. 5, the validation circuit 500 comprises: a kick circuit 501 having a first input terminal and a second input terminal configured to receive the third pair of differential signals POUT and NOUT, and an output terminal configured to provide a kick signal KP based on the differential signals POUT and NOUT; a state discriminator 502 having a first input terminal and a second input terminal configured to receive the third pair of differential signals POUT and NOUT, and an output terminal configured to provide a reset signal RST based on the third pair of differential signals POUT and NOUT; a timer 503 having a first input terminal configured to receive the kick signal KP, a second input terminal configured to receive the reset signal RST, and an output terminal configured to generate the output signal DOUT of the isolator system based on the kick signal KP and the reset signal RST.

The reset signal RST pulses only when consecutive and alternating differential signals POUT and NOUT occur, i.e., the reset signal RST pulses only when true differential signals are encountered.

The kick circuit 501 is configured to detect the differential signals POUT and NOUT. In one embodiment, when the kick circuit 501 detects the pulses of the differential signal POUT or NOUT, the kick signal KP triggers the timer 503 to start a low-to-high timeout period. The timer 503 memorizes the pulse occurrence of the reset signal RST during the low-to-high period. Then upon elapse of the low-to-high timeout period, if a preset number of pulses of the reset signal RST is met or detected, the output signal DOUT is set logic high. Otherwise, the output signal DOUT stays logic low. The timer 503 is reset and not progressing when the system is in idle state and the output signal DOUT is logic low. The timer 503 will commence timing out again when triggered by the kick signal KP. Meanwhile, when the output signal DOUT becomes logic high right after the low-to-high timeout, the timer 503 will begin a high-to-low timeout period. During this high-to-low timeout period, any occurrence of RST signal causes a stop on the timeout period until RST signal ceases to occur. If the timer 503 does not detect anymore the reset signal RST pulses during this high-to-low timeout period, the timer 503 will eventually times out, the output signal DOUT will be reset to logic low.

Figure 6:
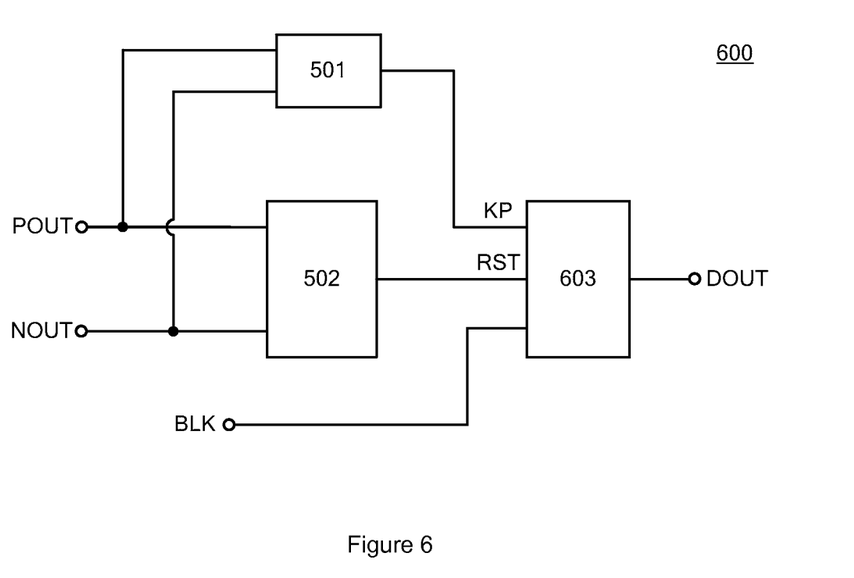
FIG. 6 schematically shows a signal validation circuit 600 in accordance with an embodiment of the present invention.

FIG. 6 schematically shows a validation circuit 600 in accordance with an embodiment of the present invention. The validation circuit 600 has similar operation with the validation circuit 500 in FIG. 5 except for that the timer 603 in the example of FIG. 6 further has a third input terminal configured to receive the block signal BLK. The block signal BLK momentarily stalls or resets the timer 603 when fast CMTI event is encountered. In other words, the output signal DOUT keeps unchanged during fast CMTI event.

Figure 7:
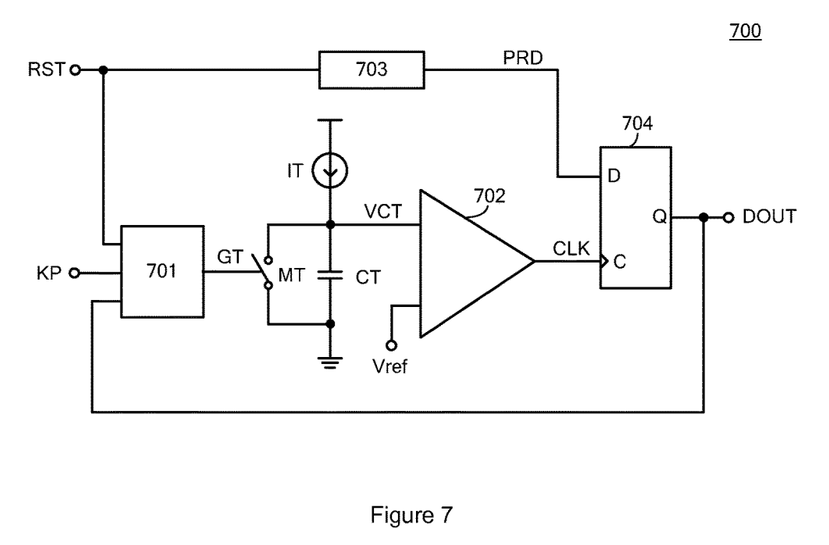
FIG. 7 schematically shows a timer 700 in accordance with an embodiment of the present invention.

FIG. 7 schematically shows a timer 700 in accordance with an embodiment of the present invention. As shown in FIG. 7, the timer 700 comprises: a logic circuit 701 having a first input terminal configured to receive the reset signal RST, a second input terminal configured to receive the kick signal KP, a third input terminal configured to receive the output signal DOUT of the isolator system, and an output terminal configured to provide a switch control signal GT based on the reset signal RST, the kick signal KP and the output signal DOUT; a current source IT configured to provide a current; a capacitor CT coupled between the current source IT and a ground reference; a discharge switch MT coupled across the capacitor CT, wherein the discharge switch MT has a control terminal configured to receive the switch control signal GT, and wherein the discharge switch MT is turned ON and OFF by the switch control signal GT; a comparator 702 having an input terminal configured to receive a voltage signal VCT across the capacitor CT, and an output terminal configured to provide a clock signal CLK based on the voltage signal VCT; a pulse counting circuit 703 having an input terminal configured to receive the reset signal RST, and an output terminal configured to provide a pulse detecting signal PRD based on the reset signal RST; and a D flip-flop 704 having an input terminal "D" configured to receive the pulse detecting signal PRD, a clock terminal "C" coupled to the comparator 702 to receive the clock signal CLK, and an output terminal "Q" configured to provide the output signal DOUT based on the pulse detecting signal PRD and the clock signal CLK.

In one embodiment, during when the output signal DOUT is logic low, once the kick signal KP pulses, the switch control signal GT turns off the discharge switch MT. Then the capacitor CT is charged by the current source IT, and the voltage signal VCT across the capacitor CT ramps up to a reference signal Vref. After timeout, the comparator 702 generates a clock signal CLK to clock in the state of the signal PRD from D flip-flop 704's input terminal "D" to its output terminal "Q". The pulse counting circuit 703 may comprise a register to memorize pulse occurrence of the reset signal RST. In one embodiment, the pulse detecting signal PRD is set logic high when the preset number pulses of the reset signal RST is detected. The D flip-flop 704 transfers the state of the signal PRD to the output terminal "Q" during when a timeout occurs. Otherwise, when the pulse detecting signal PRD is still reset logic low due to non-occurrence of a valid, consecutive, or alternating differential signals, then the output signal DOUT stays logic low. Once the output signal DOUT flips to logic high, the switch control signal GT turns off the discharge switch MT to start the high-to-low timeout period. During the high-to-low timeout period, any occurrence of RST signal causes a reset on the high-to-low timer ramp by turning on the discharge switch MT, thus high-to-low timeout period is stopped until the reset signal RST gets deasserted. If the pulse counting circuit 703 does not detect anymore the reset signal RST pulses during this high-to-low timeout period, the timer 700 will eventually times out, and the output signal DOUT will be reset to logic low.

In one embodiment, during low-to-high timeout period, the timer 700 looks only for one pulse occurrence of the reset signal RST before it sets the pulse detecting signal PRD high. In another embodiment, during low-to-high timeout period, the timer 700 looks for two or more pulse occurrences of the reset signal RST before it sets the pulse detecting signal PRD high. The more signal pulse occurrences of the reset signal RST is required, the better the CMTI performance. However, the more pulse occurrences of the reset signal RST is required, the longer the low-to-high validation time (thus longer propagation delay needed) or the higher the transmitter Carr frequency operation (which may be prohibited by process technology, circuit limitation or power consumption limitation). In another embodiment, during low-to-high timeout period, an occurrence of reset signal RST pulse directly and immediately completes the timeout period.

Figure 8:
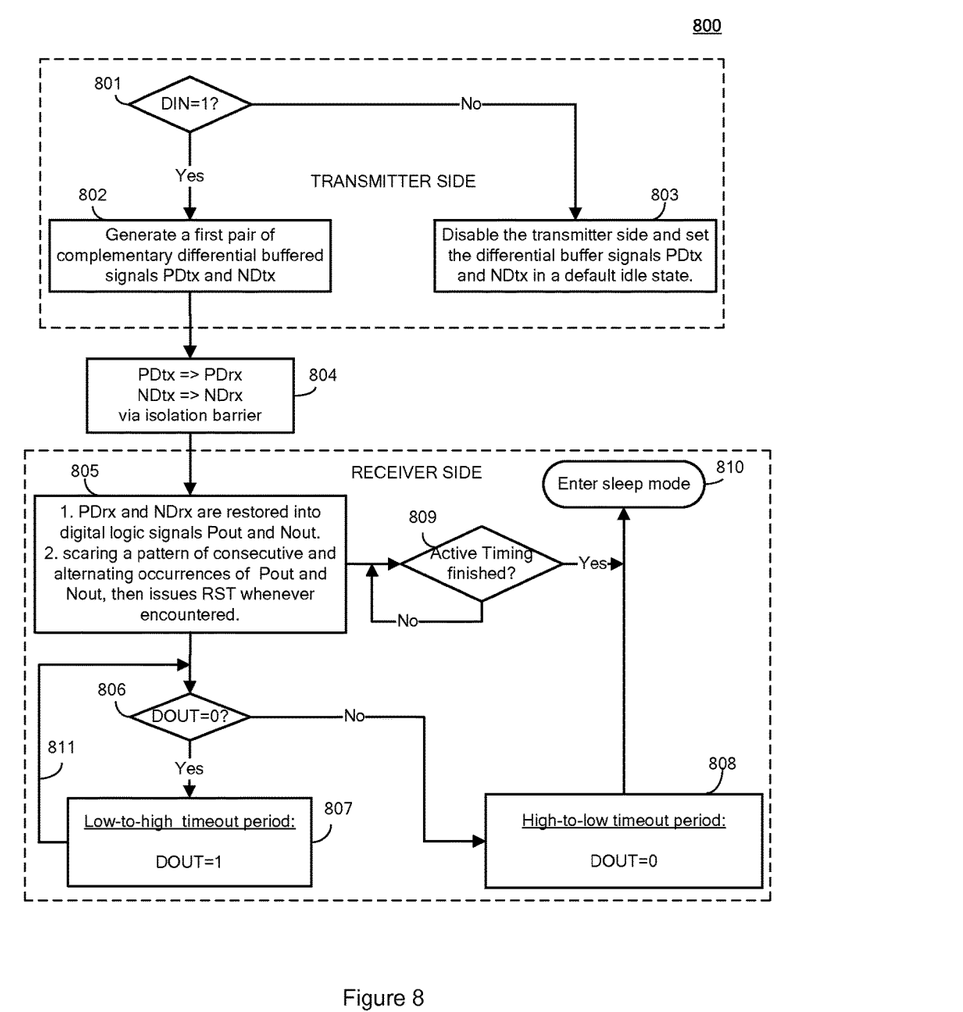
FIG. 8 shows a flow chart of a control method 800 of a digital isolator system.

FIG. 8 shows a flow chart of a control method 800 for a digital isolator system. The digital isolator system comprises a transmitter, an isolation barrier and a receiver. As shown in FIG. 8, the control method 800 comprises: step 801, determining if an input signal Din is in a first logic state, if yes, goes to step 802, otherwise, goes to step 803; step 802, generating a first pair of complementary buffered differential signals PDtx and NDtx based on the input signal Din; step 803, disabling a transmitter side and setting the differential buffer signals PDtx and NDtx in a default idle state; step 804, transmitting the signals PDtx and NDtx to a second pair of differential signals PDrx and NDrx via an isolation barrier; step 805, restoring the signals PDrx and NDrx to a third pair of differential signals POUT and NOUT with valid logic level, wherein the pattern of consecutive and alternating occurrences of the signals POUT and NOUT are detected for issuing a reset signal RST; step 806, determining if the output signal DOUT is in a second logic state, if yes, goes to step 807, otherwise, goes to step 808; step 807, starting a timeout period to finally set the output signal DOUT in a first logic state; step 808, starting a timeout period to finally set the output signal DOUT in a second logic state; step 809, detecting if active timing is finished, if yes, goes to step 810, otherwise, goes to step 805; step 810, setting a receiver side into a sleep mode; step 811, returning back to step 806 after step 807.

In one embodiment, the first logic state comprises a logic high state, and the second logic state comprises a logic low state. Meanwhile, the timeout period comprises a low-to-high timeout period, and a high-to-low timeout period.

In one embodiment, the method 800 further comprises step 812, resetting the timing period when a fast CMTI event occurs.

In one embodiment, the method 800 further comprises: setting the receiver side in a weakly biased state until the second pair of differential signals PDrx and NDrx are asserted.

In one embodiment, the method 800 further comprises: setting the receiver side in a power saving state until the second pair of differential signals PDrx and NDrx are asserted.

While the above Detailed Description describes certain embodiments, the present invention is not limited to the features described and may be practice in many ways. Details of the system may vary in implementation, while still being encompassed by the present invention disclosed herein. Accordingly, the scope of the present invention encompasses not only the disclosed embodiments, but also all equivalent ways of practicing or implementing the present invention under the claims.

I claim:

1. A digital isolator system, comprising:
   a transmitter configured to generate a first pair of buffered differential signals based on an input signal;
   an isolation barrier having an input side coupled to the transmitter to receive the first pair of buffered differential signals, and an output side configured to provide a second pair of differential signals; and
   a receiver coupled to the output side of the isolation barrier to receive the second pair of differential signals, wherein the receiver is configured to provide an output signal based on restoring the second pair of differential signals into a third pair of differential signals with valid logic levels, wherein the output signal is converted from the third pair of differential signals and is essentially a duplicate of the input signal but with inherited propagation delays.

2. The digital isolator system of claim 1, wherein the transmitter comprises:
   a carrier signal generator having an input terminal configured to receive the input signal, and an output terminal configured to provide an input indication signal based on the input signal; and
   a differential driver having an input terminal coupled to the output terminal of the carrier signal generator to receive the input indication signal, and a pair of output terminals configured to provide the first pair of buffered differential signals.

3. The digital isolator system of claim 1, wherein the receiver comprises:
   a first switch having a first terminal configured to receive one of the second pair of differential signals, a control terminal configured to receive a wakeup signal, and a second terminal configured to switch the signal at the first terminal to the second terminal when the wakeup signal is valid;
   a second switch having a first terminal configured to receive the other one of the second pair of differential signals, a control terminal configured to receive the wakeup signal, and a second terminal configured to switch the signal at the first terminal to the second terminal when the wakeup signal is valid;
   a differential comparator having a wakeup terminal configured to receive the wakeup signal, a first input terminal coupled to the second terminal of the first switch, a second input terminal coupled to the second terminal of the second switch, and a pair of output terminals configured to provide a third pair of differential signals based on the wakeup signal, and the signals at the first input terminal and the second input terminal;
   a wakeup circuit having a first input terminal configured to receive the output signal of the digital isolator system, a second input terminal and a third input terminal configured to receive the second pair of differential signals respectively, and an output terminal configured to provide the wakeup signal based on the output signal of the digital isolator system, and the second pair of differential signals; and
   a validation circuit having a wakeup terminal configured to receive the wakeup signal, a first input terminal and a second input terminal configured to receive the third pair of differential signals, and an output terminal configured to provide the output signal of the digital isolator system based on the second pair of differential signals and the wakeup signal.

4. The digital isolator system of claim 3, wherein each of the first switch and the second switch has an equivalent resistance in a range of 10 KOhm~1 MOhm when in the OFF state.

5. The digital isolator system of claim 3, wherein resistors in a range of 10 KOhm~1 MOhm are respectively configured across the first switch and the second switch.

6. The digital isolator system of claim 3, wherein the validation circuit comprises:
   a kick circuit having a first input terminal and a second input terminal configured to receive the third pair of differential signals, and an output terminal configured to provide a kick signal based on the third pair of differential signals;
   a state discriminator having a first input terminal and a second input terminal configured to receive the third pair of differential signals, and an output terminal configured to provide a reset signal based on the third pair of differential signals; and
   a timer having a first input terminal configured to receive the kick signal, a second input terminal configured to receive the reset signal, and an output terminal configured to generate the output signal of the digital isolator system based on the kick signal and the reset signal.

7. The digital isolator system of claim 6, wherein the timer comprises:
   a logic circuit having a first input terminal configured to receive the reset signal, a second input terminal configured to receive the kick signal, a third input terminal configured to receive the output signal of the digital isolator system, and an output terminal configured to provide a switch control signal based on the reset signal, the kick signal and the output signal;
   a current source configured to provide a current;
   a capacitor coupled between the current source and a ground reference;
   a discharge switch coupled across the capacitor, wherein the discharge switch has a control terminal configured to receive the switch control signal, and wherein the discharge switch is turned on and off by the switch control signal;
   a comparator having an input terminal configured to receive a voltage signal across the capacitor, and an output terminal configured to provide a clock signal based on the voltage signal;

a pulse counting circuit having an input terminal configured to receive the reset signal, and an output terminal configured to provide a pulse detecting signal based on the reset signal; and a D flip-flop having an input terminal configured to receive the pulse detecting signal, a clock terminal coupled to the comparator to receive the clock signal, and an output terminal configured to provide the output signal of the digital isolator system based on the pulse detecting signal and the clock signal.

8. The digital isolator system of claim 3, wherein the receiver further comprises:

a block circuit having a first input terminal configured to receive an average signal of the second pair of differential signals, a second input terminal configured to receive an upper threshold signal, a third input terminal configured to receive a lower threshold signal, and an output terminal configured to provide a block signal based on the upper threshold signal, the lower threshold signal and the average signal of the second pair of differential signals; and the validation circuit further has a fourth input terminal configured to receive the block signal, wherein the output terminal of the validation circuit provides the output signal of the isolator system based on the second pair of differential signals, the wakeup signal and the block signal.

9. The digital isolator system of claim 8, wherein the validation circuit comprises:

a kick circuit having a first input terminal and a second input terminal configured to receive the third pair of differential signals, and an output terminal configured to provide a kick signal based on the third pair of differential signals;

a state discriminator having a first input terminal and a second input terminal configured to receive the third pair of differential signals, and an output terminal configured to provide a reset signal based on the third pair of differential signals; and a timer having a first input terminal configured to receive the kick signal, a second input terminal configured to receive the reset signal, a third input terminal configured to receive the block signal, and an output terminal configured to generate the output signal of the isolator system based on the kick signal, the reset signal and the block signal.

10. The digital isolator system of claim 1, wherein the receiver comprises:

a differential comparator having a first input terminal configured to receive one of the second pair of differential signals, a second input terminal configured to receive the other one of the second pair of differential signals, and a pair of output terminals configured to provide a third pair of differential signals based on the second pair of differential signals; and a validation circuit having a first input terminal and a second input terminal configured to receive the third pair of differential signals, and an output terminal configured to provide the output signal of the isolator system based on the second pair of differential signals.

11. The digital isolator system of claim 10, wherein the validation circuit comprises:

a kick circuit having a first input terminal and a second input terminal configured to receive the third pair of differential signals, and an output terminal configured to provide a kick signal based on the third pair of differential signals;

a state discriminator having a first input terminal and a second input terminal configured to receive the third pair of differential signals, and an output terminal configured to provide a reset signal based on the third pair of differential signals; and a timer having a first input terminal configured to receive the kick signal, a second input terminal configured to receive the reset signal, and an output terminal configured to generate the output signal of the digital isolator system based on the kick signal and the reset signal.

12. The digital isolator system of claim 11, wherein the timer comprises:

a logic circuit having a first input terminal configured to receive the reset signal, a second input terminal configured to receive the kick signal, a third input terminal configured to receive the output signal of the digital isolator system, and an output terminal configured to provide a switch control signal based on the reset signal, the kick signal and the output signal;

a current source configured to provide a current;

a capacitor coupled between the current source and a ground reference;

a discharge switch coupled across the capacitor, wherein the discharge switch has a control terminal configured to receive the discharge switch control signal, and wherein the discharge switch is turned on and off by the switch control signal;

a comparator having an input terminal configured to receive a voltage signal across the capacitor, and an output terminal configured to provide a clock signal based on the voltage signal;

a pulse counting circuit having an input terminal configured to receive the reset signal, and an output terminal configured to provide a pulse detecting signal based on the reset signal; and a D flip-flop having an input terminal configured to receive the pulse detecting signal, a clock terminal coupled to the comparator to receive the clock signal, and an output terminal configured to provide the output signal based on the pulse detecting signal and the clock signal.

13. The digital isolator system of claim 10, wherein the receiver further comprises:

a block circuit having a first input terminal configured to receive an average signal of the second pair of differential signals, a second input terminal configured to receive an upper threshold signal, a third input terminal configured to receive a lower threshold signal, and an output terminal configured to provide a block signal based on the upper threshold signal, the lower threshold signal and the average signal of the second pair of differential signals; and the validation circuit further has a fourth input terminal configured to receive the block signal, wherein the output terminal of the validation circuit provides the output signal of the isolator system based on the second pair of differential signals and the block signal.

14. The digital isolator system of claim 13, wherein the validation circuit comprises:

a kick circuit having a first input terminal and a second input terminal configured to receive the third pair of differential signals, and an output terminal configured to provide a kick signal based on the third pair of differential signals;

a state discriminator having a first input terminal and a second input terminal configured to receive the third pair of differential signals, and an output terminal configured to provide a reset signal based on the third pair of differential signals; and a timer having a first input terminal configured to receive the kick signal, a second input terminal configured to receive the reset signal, a third input terminal configured to receive the block signal, and an output terminal configured to generate the output signal of the digital isolator system based on the kick signal, the reset signal and the block signal.

15. The digital isolator system of claim 1, wherein the isolation barrier comprises a pair of capacitors, and each capacitor has a first terminal configured to receive one of the first pair of buffered differential signals, and a second terminal configured to be provided correspondingly one of the second pair of differential signals.

16. A control method for controlling a digital isolator system, comprising:

determining if an input signal is in a first logic state, if yes, generating a first pair of buffered differential signals based on the input signal, otherwise, disabling a transmitter side and setting the first pair of buffered differential signals in a default idle state;

transmitting the first pair of buffered differential signals to a second pair of differential signals via an isolation barrier;

restoring the second pair of differential signals to a third pair of differential signals with valid logic level, wherein the pattern of consecutive and alternating occurrences of the third pair of differential signals are detected for issuing a reset signal;

determining if the output signal is in a second logic state, if yes, starting a timeout period to finally set the output signal in a first logic state, otherwise, starting a timeout period to finally set the output signal in the second logic state;

detecting if active timing is finished, if yes, setting a receiver side into a sleep mode, otherwise, restoring the signals to a third pair of differential signals with valid logic level, wherein the pattern of consecutive and alternating occurrences of the third pair of differential signals are detected for issuing a reset signal; and determining if the output signal is in a first logic state after the timeout period, if yes, starting a timeout period to finally set the output signal in a second logic state, otherwise, setting a receiver side into the sleep mode.

17. The control method of claim 16, wherein the first logic state comprises a logic high state, and the second logic state comprises a logic low state.

18. The control method of claim 16, wherein the timeout period comprises a low-to-high timeout period and a high-to-low timeout period.

19. The control method of claim 16, further comprising: resetting the time out period when a fast Common Mode Transient Immunity (CMTI) event occurs.

20. The control method of claim 16, further comprising setting the receiver side in a weakly biased state until the second pair of differential signals are asserted.

21. The control method of claim 16, further comprising setting the receiver side in a power saving state until the second pair of differential signals are asserted.

* * * * *